No. 623,825. Patented Apr. 25, 1899.
S. PRIEST & S. PRIEST, Jr.
BACK PEDALING BRAKE.
(Application filed Sept. 28, 1898.)
(No Model.)
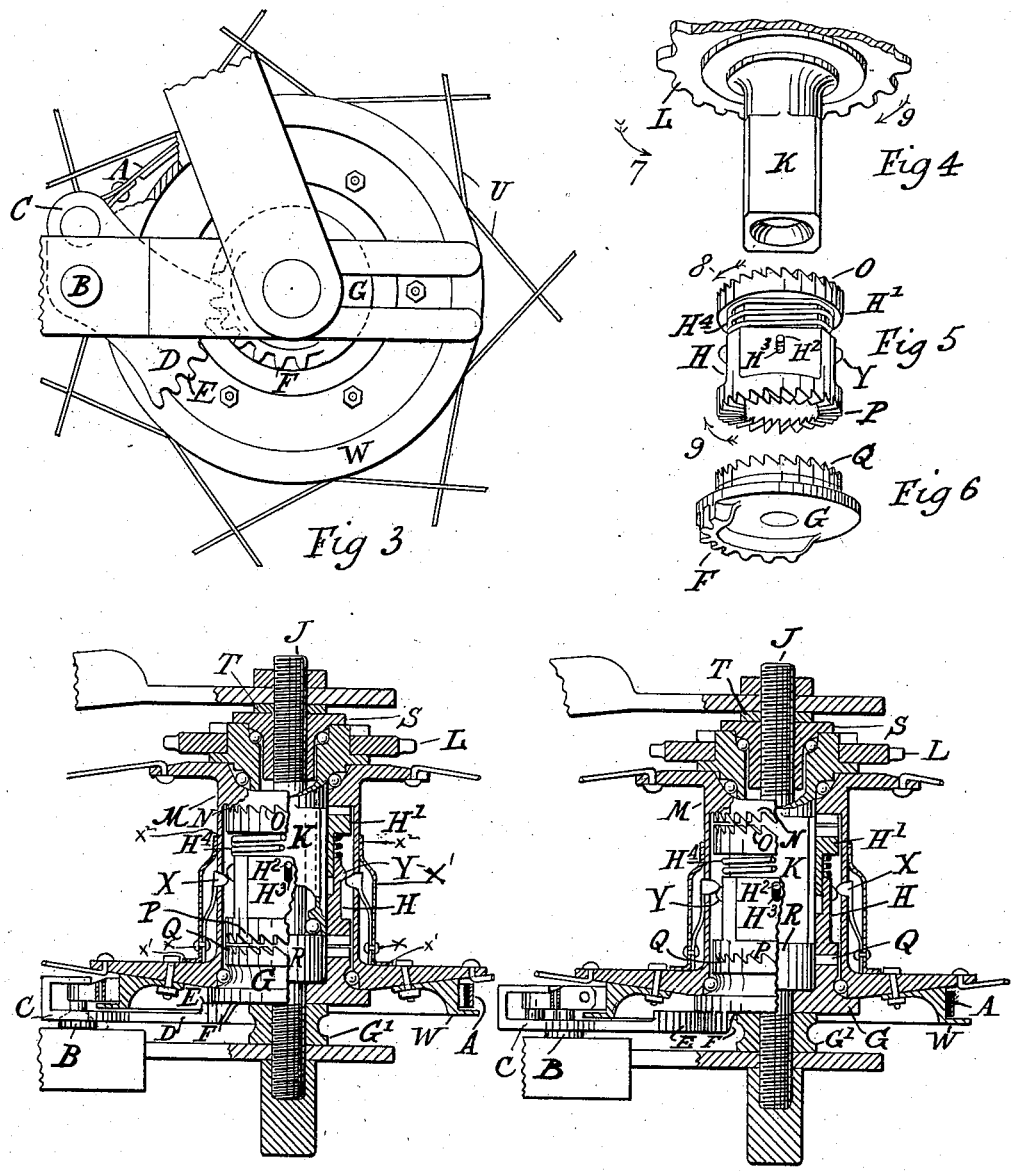

United States Patent Office.

STEPHEN PRIEST AND STEPHEN PRIEST, JR., OF WEST DEVONPORT, TASMANIA.

BACK-PEDALING BRAKE.

SPECIFICATION forming part of Letters Patent No. 623,825, dated April 25, 1899.

Application filed September 28, 1898. Serial No. 692,092. (No model.)

*To all whom it may concern:*

Be it known that we, STEPHEN PRIEST and STEPHEN PRIEST, the Younger, subjects of the Queen of the United Kingdom of Great Britain and Ireland, residing in West Devonport, in the Colony of Tasmania, have invented certain new and useful Improvements in Cycle Hub Brakes; and we do hereby declare that the following is a full, clear, and exact description thereof, which will enable others skilled in the art to which it appertains to make and use the same.

The brake mechanism which forms the subject of this invention is of small weight and comprises an inclosed clutch-gear at the hub of the driving-wheel, the said clutch being out of sight and protected from mechanical injury, and other parts, as shown on the attached drawings. The brake is applied by the action of the feet instead of by the hands, as with most brakes, and the feet are always allowed to remain in position on the pedals. The pedals will be motionless when the brake is on and so act as foot-rests, the rider being able to immediately recommence forward pedaling at will. This feature is notably beneficial to the rider when descending any hill or grade where the machine will run by itself, as by having the pedals motionless the labor of ordinary back-pedaling is obviated.

In the drawings herewith, Figure 1 is a plan, partly in horizontal section, of the hub of the driving-wheel of a safety-bicycle or the like, there being around the central axle a driving-axle and outside the latter the barrels of a hollow clutch, the said barrels being adapted to slide laterally. In this figure the brake is "off." Fig. 2 is also a plan, partly in horizontal section, as in Fig. 1, but with the brake "on." Fig. 3 is a side elevation with the brake off, showing the parts outside the hub, which parts may in practice be preserved from dust and interference by a cover. (Not shown.) Figs. 4 to 6 are perspective views of respective details.

A is a friction or brake band, one end of which is connected by a suitable supporting-stud B to the backstay or other convenient part of the frame of the cycle and the other end of which is connected to a lug C on a movable quadrant D, which is pivoted upon the stud B. The teeth E of the quadrant engage teeth F, located upon the cylindrical member G of the clutch, which is acted on by the barrel H when the brake is applied. A barrel H' is provided, which telescopes into barrel H and has its range of movement limited by a pin H² on H', working in a slot H³ in H. The relative positions of H' and H are kept in normal adjustment by a strong spring H⁴, the use of said spring being further explained hereinafter.

J is a stationary central axle passing loosely through the cylinder G and also loosely through the driving-axle K, which may be integral with, but is usually keyed to, the driving-sprocket L. The axle K is square or of other equivalent section and extends through H and H', which each fit it accurately, so that both barrels turn together as the driving-axle K turns.

M is the hollow hub, having fixed thereto within one end a ring of ratchet-teeth N, with which a corresponding ring of teeth O at one end of H' engages when the brake is off.

Q is a ring of ratchet-teeth on G, with which a corresponding ring of teeth P on the near end of H engages when the brake is on. The normal combined length of barrels H H' is shorter than the distance between the teeth N and Q, and these barrels slide laterally whenever the brake is put on or off. In order that the part G may be unable to slide along the axle J, the latter has a collar R upon it, against which one side of G abuts, there being on the other side of G a retaining-nut G'.

S is a cap or nut to adjust the driving-axle K and its bearings in place, and T is a check-nut. When going forward with the brake off, the sprocket L, with axle K, revolves (upon suitable bearings) in the direction of arrow 7, Fig. 4, and barrels H' and H revolve in the direction of arrow 8, Fig. 5, the teeth O and N being interlocked. To put on the brake, the rider stops pedaling. This stops the chain (or its equivalent) and also the sprocket L and the axle K; but as the driving-wheel U continues to rotate the teeth N do not stop moving, and, being unable to carry teeth O with them, they push the latter toward G until teeth O are free from teeth N and teeth P are interlocked with teeth Q, any clashing of P and Q being softened by the resilience of barrel H, allowed by the spring H⁴. As soon as P and Q engage the effect of a slight back pressure on the pedals (causing their movement backward) is to make the chain turn sprocket L, with axle K and also barrels H' and H, in the direction of arrow 9, Figs. 4 and 5, whereupon the teeth F begin to turn, thereby swinging quadrant D and closing up the band A upon a brake-flange W, which is bolted to the hub. Then so long as the rider holds the pedals at rest the brake must remain on; but when he starts to pedal forward the barrels H' H will begin to move as per arrow 8 and turn G, so as to take off the brake. The teeth P, however, owing to their bevel will also proceed to glide out of engagement with teeth Q, bringing teeth O into engagement with teeth N. A pair of inwardly-pressing beveled spring-teeth X, secured at $x\ x$ to a shell X', which incloses a portion of the hub M and is fastened at $x'\ x'$ to one of the flanges thereof and fits closely upon the hub at $x^2\ x^2$ are used to keep the barrels H H' positively at one side or the other of their range of movement, so that the teeth O or P when not in engagement shall not by friction be worn down. The beveled teeth X press upon lugs Y (with beveled sides) upon barrel H, and by reason of the pressure of the inclined surfaces the longitudinal movement of barrel H toward whichever side the ratchet-teeth are to be engaged is accelerated and slightly added to.

What we claim is—

1. In a cycle hub-brake, the combination with a non-rotating axle, a hollow driving-axle angular in cross-section mounted thereon, a barrel composed of two telescopic members provided with right and left ratchet-teeth upon their outer ends fitting said driving-axle to rotate therewith, but having axial movement thereon, a cylinder mounted upon the fixed axle at one end of said barrel and having ratchet-teeth arranged to engage the teeth upon the adjacent member of said barrel when the driving-axle is turned backward, a hub loosely inclosing said barrel and having interior ratchet-teeth arranged to engage the ratchet-teeth upon the other member of said barrel when the driving-axle is turned forward, the said cylinder having a limited rotary movement upon the fixed axle at the forward extremity of which movement the teeth on the adjacent member of said barrel will pass over the teeth on said cylinder, and means for retaining said barrel in either of its engagements, subject to displacement by a reverse movement of the driving-axle, substantially as described.

2. In a cycle hub-brake, the combination with a non-rotating axle, a hollow driving-axle angular in cross-section mounted thereon, a barrel composed of two telescopic members provided with right and left ratchet-teeth upon their outer ends fitting said driving-axle to rotate therewith, but having axial movement thereon, a coil-spring interposed between the two members of said barrel, means for allowing to the members of said barrel a limited axial movement with respect to each other, a cylinder mounted upon the fixed axle at one end of said barrel, and having ratchet-teeth arranged to engage the teeth upon the adjacent member of said barrel, when the driving-axle is turned backward, a hub loosely inclosing said barrel and having interior ratchet-teeth arranged to engage the ratchet-teeth upon the other member of said barrel when the driving-axle is turned forward, the said cylinder having a limited rotary movement upon the fixed axle at the forward extremity of which movement the teeth on the adjacent member of said barrel will pass over the teeth on said cylinder, and means for retaining said barrel in either of its engagements subject to displacement by a reverse movement of the driving-axle, substantially as described.

3. In a cycle hub-brake, the combination with a non-rotating axle, a hollow driving-axle angular in cross-section mounted thereon, a barrel composed of two telescopic members provided with right and left ratchet-teeth upon their outer ends fitting said driving-axle to rotate therewith, but having axial movement thereon, a cylinder mounted upon the fixed axle at one end of said barrel, and having ratchet-teeth arranged to engage the teeth upon the adjacent member of said barrel, when the driving-axle is turned backward, a hub loosely inclosing said barrel and having interior ratchet-teeth arranged to engage the ratchet-teeth upon the other member of said barrel when the driving-axle is turned forward, the said cylinder having a limited rotary movement upon the fixed axle whereby the forward movement of the driving-axle will cause the disengagement of the ratchet-teeth on said cylinder from the ratchet-teeth on the adjacent member of said barrel, means for retaining said barrel in either of its engagements subject to displacement by a reverse movement of the driving-axle, a toothed segment upon said cylinder, a rack-bar having teeth adapted to engage said toothed segment pivoted to a fixed portion of the frame, and a brake-band connected to said rack-bar, substantially as described.

4. In a cycle hub-brake, the combination with a non-rotating axle, a hollow driving-axle angular in cross-section mounted thereon, a barrel composed of two telescopic members provided with right and left ratchet-teeth upon their outer ends fitting said driving-axle to rotate therewith, but having axial movement thereon, a cylinder mounted upon the fixed axle at one end of said barrel and having ratchet-teeth arranged to engage the teeth upon the adjacent member of said barrel when the driving-axle is turned backward, a hub loosely inclosing said barrel and having interior ratchet-teeth arranged to engage the ratchet-teeth upon the other member of said barrel when the driving-axle is turned forward, the said cylinder having a limited rotary movement upon the fixed axle at the forward extremity of which movement the teeth on the adjacent member of said barrel will pass over the teeth on the said cylinder; lugs on one member of said barrel, and springteeth carried by the hub arranged to engage said lugs for retaining said barrel in either of its extreme positions subject to displacement by a reverse movement of the driving-axle, substantially as described.

5. In a cycle hub-brake, the combination with a non-rotating axle, a hollow driving-axle angular in cross-section mounted thereon, a barrel composed of two telescopic members provided with right and left ratchet-teeth upon their outer ends fitting said driving-axle to rotate therewith, but having axial movement thereon, a cylinder mounted upon the fixed axle at one end of said barrel, and having ratchet-teeth arranged to engage the teeth upon the adjacent member of said barrel, when the driving-axle is turned backward, a hub loosely inclosing said barrel and having interior ratchet-teeth arranged to engage the ratchet-teeth upon the other member of said barrel when the driving-axle is turned forward, the said cylinder having a limited rotary movement upon the fixed axle whereby the forward movement of the driving-axle will cause the disengagement of the ratchet-teeth on said cylinder from the ratchet-teeth on the adjacent member of said barrel, means for retaining said barrel in either of its engagements subject to displacement by a reverse movement of the driving-axle, a toothed segment upon said cylinder, a rack-bar having teeth adapted to engage said toothed segment pivoted to a fixed portion of the frame, a brake-flange on said hub, a band-brake encircling said flange and secured at one end to a fixed portion of the frame, and at its other end to said pivoted rack-bar, substantially as described.

In witness whereof we have hereunto set our hands in presence of two witnesses.

S. PRIEST.
STEPHEN PRIEST, JNR.

Witnesses:
CHARLES PEARL,
W. H. OWEN.